US010462821B2

United States Patent
Yi et al.

(10) Patent No.: US 10,462,821 B2
(45) Date of Patent: Oct. 29, 2019

(54) COLLISION PROCESSING FOR MESSAGE RETRANSMISSION

(71) Applicant: Cisco Technology, Inc., San Jose, CA (US)

(72) Inventors: Nan Yi, Shanghai (CN); Huimin She, Shanghai (CN); Yong Zhang, Shanghai (CN); Chuanwei Li, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/905,647

(22) Filed: Feb. 26, 2018

(65) Prior Publication Data

US 2019/0268942 A1 Aug. 29, 2019

(51) Int. Cl.
*H04W 74/08* (2009.01)

(52) U.S. Cl.
CPC ............... *H04W 74/0816* (2013.01)

(58) Field of Classification Search
CPC .................................................. H04W 74/0816
See application file for complete search history.

(56) References Cited

U.S. PATENT DOCUMENTS

| 5,673,254 | A | * | 9/1997 | Crayford | ............... | H04L 47/10 370/231 |
| 2004/0085992 | A1 | * | 5/2004 | Wentink | ............... | H04L 12/413 370/445 |
| 2019/0036754 | A1 | * | 1/2019 | Lee | ............... | H04L 27/2607 |

OTHER PUBLICATIONS www.extrahop.com, "Network Security Analytics", Powered by AI. https://www.extrahop.com/solutions/initiative/security/, web page last viewed on Feb. 28, 2018, 11 pages.
Rubinstein et al., "A Survey on Wireless Ad Hoc Networks", dated 2006, 33 pages.
Misic et al., "Medium Access in Ad Hoc and Sensor Networks", dated Sep. 4, 2007, 27 pages.
Harju, Janne, "IEEE 802.11b Frequency Translation", dated Jun. 10, 2005, 76 pages.
Dao et al., "Securing Heterogeneous IoT with Intelligent DDoS Attack Behavior Learning", arXiv:1711.06041v1 [cs.NI] dated Nov. 16, 2017, 7 pages.

(Continued)

*Primary Examiner* — Duc C Ho
(74) *Attorney, Agent, or Firm* — Behmke Innovation Group LLC; James Behmke; Stephen D. LeBarron

(57) ABSTRACT

A computer-implemented method of determining backoff windows in a wireless computer network is disclosed. The method comprises defining, by an access point in the wireless computer network, a plurality of collision patterns related to message transmission via one or more communication channels in the wireless computer network; detecting, by the access point, occurrence of one of the plurality of collision patterns involving a group of sender nodes in the wireless computer network that have each transmitted a message to the access point and received no acknowledgement message from the access point indicating successful transmission; setting to a first length a length of a backoff window for avoiding collision in data transmission based on a size of the group of sender nodes; sending a first message to a first plurality of nodes in the wireless computer network, the first message instructing performance of backoff during the backoff window having the first length.

20 Claims, 6 Drawing Sheets

(56) References Cited

OTHER PUBLICATIONS

Cho, Sung Rae, "An End-to-End Freeze TCP for Ad-Hoc Networks", University of Canterbury Christchurch New Zealand dated Mar. 2004, 176 pages.
Barcelo et al, "Dynamic Parameter Adjustment in CSMA/ECA", Proceeding MACOM'10 Proceedings of the 3rd international workshop on Multiple access communications, dated 2010, 12 pages.
Ahmed, Fayyaz, "Communication Protocols, Queuing and Scheduling Delay Analysis in CANDU SCWR Hydrogen Co-generation Model", dated Aug. 2011, 159 pages.

* cited by examiner

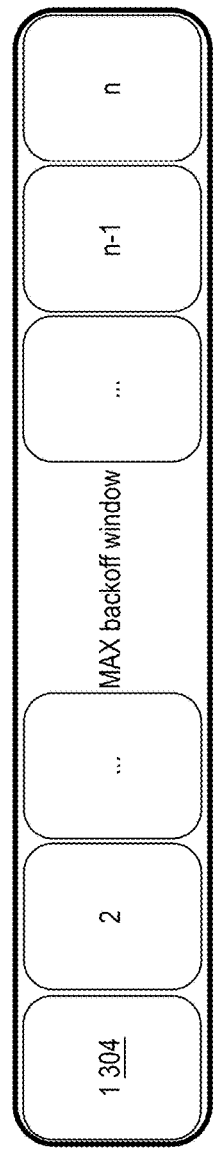
FIG. 3A
FIG. 3B
FIG. 3C

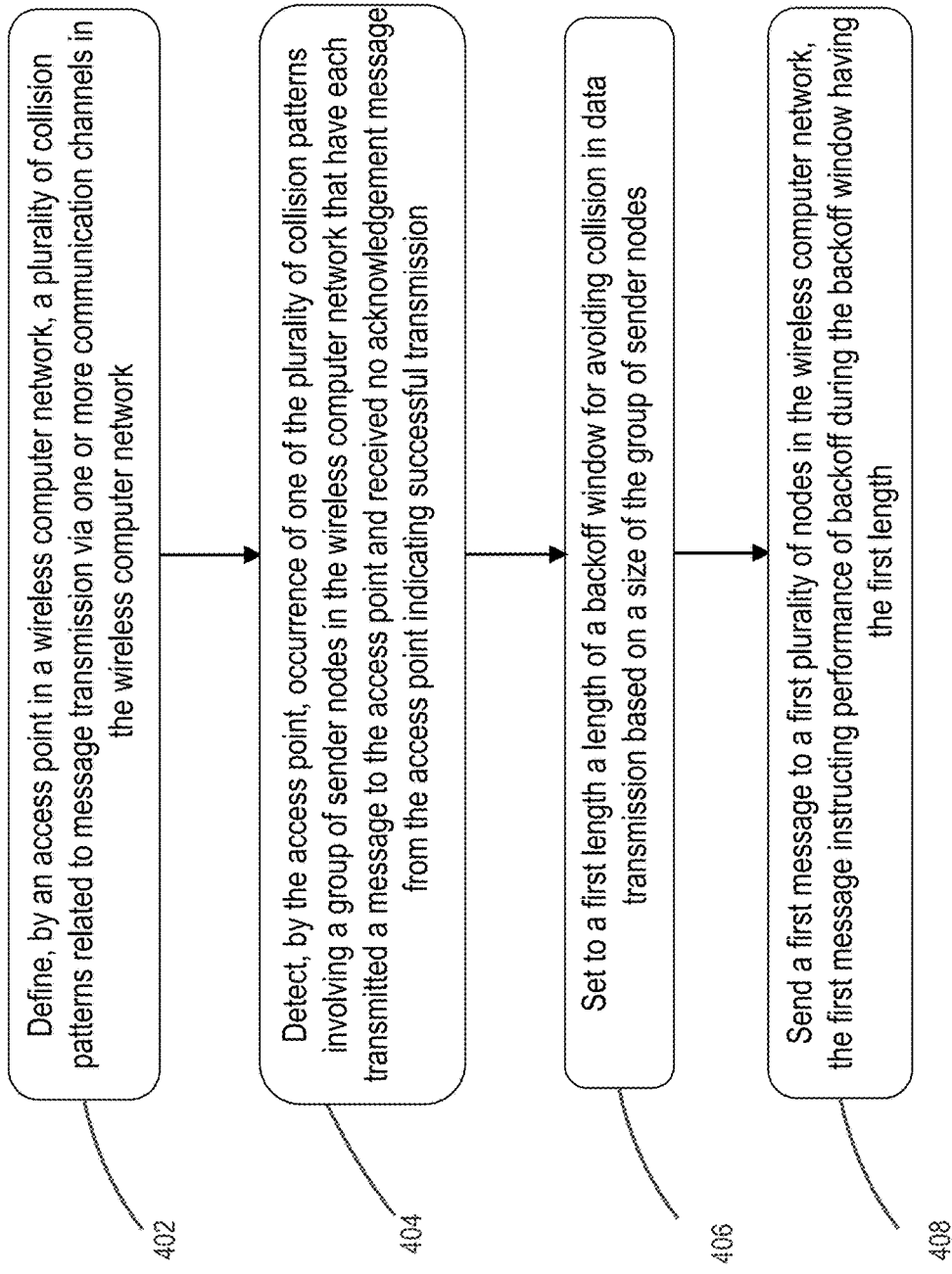

COLLISION PROCESSING FOR MESSAGE RETRANSMISSION

TECHNICAL FIELD

One technical field of the present disclosure is data transmission in computer networks. Another technical field is wireless internetworking communications devices. The disclosure relates more specifically to determination of backoff windows for message retransmission in wireless computer networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a wireless computer network, such as a CG-MESH neighborhood area network, the hidden node problem has been observed. A hidden node is electronically accessible or "visible" from a wireless access point, but not from other nodes communicating with that access point. Collision in data transmission is more likely to occur between nodes that are hidden from each other, resulting in data corruption or loss. It would be helpful to alleviate or eliminate the hidden node problem.

BRIEF DESCRIPTION OF THE DRAWINGS

FIG. 3A illustrates setting the length of a backoff window to a first length, such as a MAX value in response to a collision event.

FIG. 3B illustrates setting the length of the backoff window to a first length, such as a MAX value, and further dividing the backoff window into a number of non-overlapping slots and assigning the number of slides to certain other nodes in response to a collision event.

FIG. 3C illustrates setting the length of the backoff window to a second length, such as a MIN value, in response to a restoration event.

FIG. 4 illustrates an example process of determining backoff windows for avoiding collision in message transmission in a wireless computer network.

DETAILED DESCRIPTION

Figure 1:
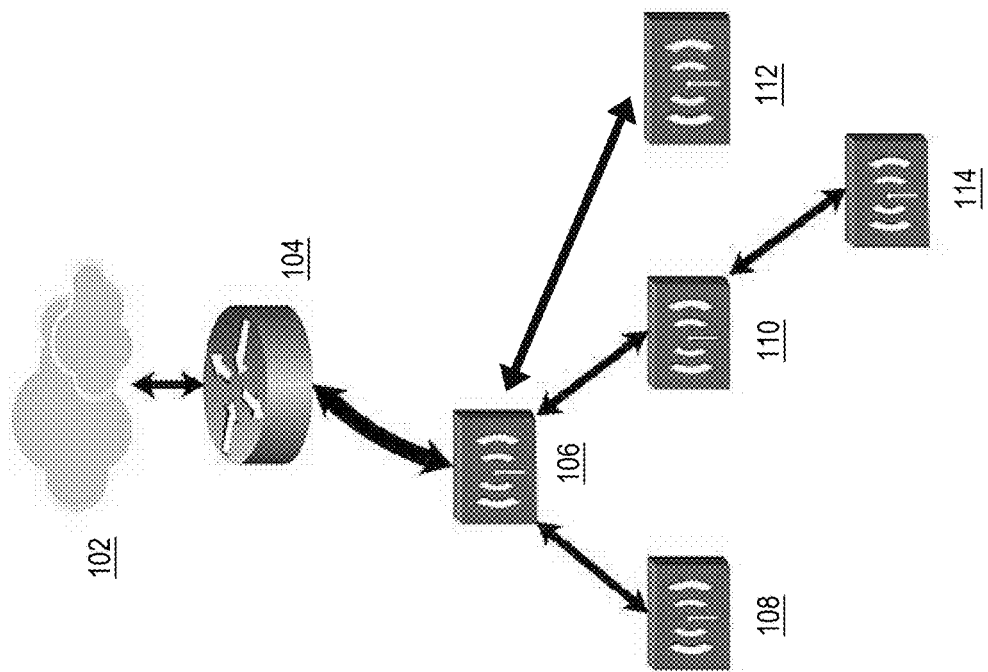
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENT
3. EXAMPLE COMPUTER COMPONENTS
4. DEFINING COLLISION EVENTS AND RESTORATION EVENTS
5. TRIGGERING COLLISION EVENTS OR RESTORATION EVENTS
6. HANDLING COLLISION EVENTS
   6.1. COMMUNICATING BACKOFF WINDOW INFORMATION
   6.2. COMMUNICATING BACKOFF SLOTS INFORMATION
7. HANDLING RESTORATION EVENTS
8. EXAMPLE PROCESSES
9. IMPLEMENTATION EXAMPLE—HARDWARE OVERVIEW
10. OTHER ASPECTS OF DISCLOSURE

1. General Overview

In an embodiment, a wireless computer network implements programmed executable methods that determine backoff windows to avoid collision in data transmission. In some embodiments, a node in a grid wireless computer network, such as a CG-MESH neighborhood area network, is an access point and is programmed or configured to define a plurality of collision patterns. For example, one collision pattern may be that two messages were received within a period of X of each other, at least one of the messages is associated with a file check sequence ("FCS") error, and the same situation has occurred for the Nth time during the last period of W. The access point is further programmed or configured to detect occurrence of one of the plurality of collision patterns involving a group of sender nodes in the wireless computer network which have each transmitted a message to the access point and received no acknowledgement message from the access point indicating successful transmission. For example, it may be detected that node 25 and node 30 satisfied the specific collision pattern, where neither the transmission by node 25 nor the transmission by node 30 was deemed successful. The access point is then programmed or configured to set to a first length a length of a backoff window for avoiding collision in data transmission and specifically message retransmission. For example, the first length could be the product of the average amount of time required to retransmit a message to the access point and the average number of nodes satisfying one of the plurality of collision patterns. The access point is then programmed or configured to send a first broadcast message to the group of sender nodes and other nodes connected to the access point, instructing performance of backoff within the backoff window having the first length. For example, node 25, node 30, and other nodes that could sense the access point could each receive the broadcast.

In some embodiments, each of the connected nodes that has received the broadcast message is programmed or configured to select a point within the backoff window having the first length, set the start time of the backoff window, and retransmit a message that has not been successfully transmitted to the access point at the selected point. For example, node 25 can select the end of the backoff window having the first length, set the start time to be when the broadcast message was sent, and retransmit the message involved in the collision pattern with node 30 to the access point.

In some embodiments, the access point is programmed or configured to divide the backoff window of the first length into a number of non-overlapping slots and assign the slots to the group of sender nodes. For example, the backoff window can be 10 minutes long and divided into 10 slots, and the first and the sixth slots may be assigned to node 25. Instead of sending a broadcast, the access point is programmed or configured to send an acknowledgment message to the group of sender nodes, instructing the performance of backoff during one of the assigned slots within the backoff window having the first length. For example, the acknowledgment message sent to node 25 would instruct node 25 to retransmit its message during the first or the sixth slot.

In some embodiments, each of the group of sender nodes is programmed or configured to select an assigned slot within the backoff window having the first length, set the start time of the backoff window, and retransmit a message that has not been successfully transmitted during the selected slot. For example, node 25 can select the first slot. By virtue of this feature, the messages retransmitted during the assigned slots of the backoff window that started at a common time would not collide with one another.

In some embodiments, the access point is further programmed or configured to detect disappearance of the one collision pattern, set the length of the backoff window to a second length less than the first length, and send a second broadcast message to the connected nodes, instructing performance of backoff within the backoff window having the second length.

In some embodiments, each of the connected nodes is programmed or configured to select a point within the backoff window having the second length, set the start time of the backoff window, and retransmit a message that has not been successfully transmitted at the selected point.

The wireless computer network and related methods produce many technical benefits, as discussed throughout this application. One main technical benefit is the reduction of collision in data transmission, thus the reduction of data errors, data loss, slow data transmission, or other transmission abnormalities. This technical benefit in turn in decreases data transmission time and increases data transmission accuracy. The determination of a backoff strategy based on a backoff window or backoff slots is made by an access point, which generally has more information regarding data collision from messages transmitted to the access point than any sender of the messages. Therefore, the backoff strategy is more likely to be successful.

In some embodiments, a computer-implemented method of determining backoff windows in a wireless computer network is disclosed. The method comprises defining, by an access point in the wireless computer network, a plurality of collision patterns related to message transmission via one or more communication channels in the wireless computer network. The method also comprises detecting, by the access point, occurrence of one of the plurality of collision patterns involving a group of sender nodes in the wireless computer network that have each transmitted a message to the access point and received no acknowledgement message from the access point indicating successful transmission. Furthermore, the method comprises setting to a first length a length of a backoff window for avoiding collision in data transmission based on a size of the group of sender nodes. The method additionally comprises sending a first message to a first plurality of nodes in the wireless computer network, the first message instructing performance of backoff during the backoff window having the first length.

In some embodiments, a computer-implemented method of performing backoff to avoid collision in data transmission in a wireless computer network is disclosed. The method comprises transmitting, by a node in the wireless computer network, a certain message to an access point in the wireless computer network. The method further comprises receiving, by the node, a first message from the access point instructing performance of backoff during a backoff window having a first length. In addition, the method comprises selecting a first point within the backoff window and setting the backoff window to start at a first time. Finally, the method comprises in response to receiving no acknowledgement message indicating successful transmission of the certain message, retransmitting the certain message to the access point at the first point within the backoff window starting at the first time and having the first length.

2. Example Computing Environment

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a wireless computer network comprises one or more nodes, such as nodes 106, 108, 110, 112, and 114, a router 104, and a storage device 102. Each of the nodes can sense another that is within the node's communication range. For example, all of nodes 108, 110, and 112 can sense node 106, as indicated by the arrows. However, they cannot sense one another because they are out of one another's communication range; they are hidden from one another.

In some embodiments, when a first node in the wireless computer network, such as node 108, wishes to communicate with a second node within its communication range, such as node 106, the first node selects a communication channel leading to the second node and determines whether the communication channel is busy or idle. The first node waits until the communication channel is idle before transmitting a message to the second node. However, the first node will not be able to detect any activity in the communication channel performed by a third node that is outside its communication range, such as node 110. Therefore, the first node will not be able to detect any collision with the third node while the first node is transmitting the message to the second node.

In some embodiments, when a collision occurs, the message transmitted from the first node to the second node may be corrupted or lost, and thus the second node will not send an acknowledgment message back to the first node indicating successful transmission of the message. Upon determining that message transmission was unsuccessful, such as not receiving an acknowledgement message within a certain amount of time, the first node may decide to retransmit the message, typically based on a backoff window. The first node may determine the start time and the length of the backoff window. Retransmission during a backoff window may help reduce the chance of further collision by increasing the probability that different messages are retransmitted at different times. For example, when the first node's message and the third node's message collide, if both nodes try to retransmit their messages to the second node immediately, there is a high probability that their retransmitted messages will again collide. However, if both nodes retransmit their messages at a random point during a backoff window that starts from the time of collision, the probability that their retransmitted messages will again collide will be lower.

3. Example Computer Components

Figure 2:
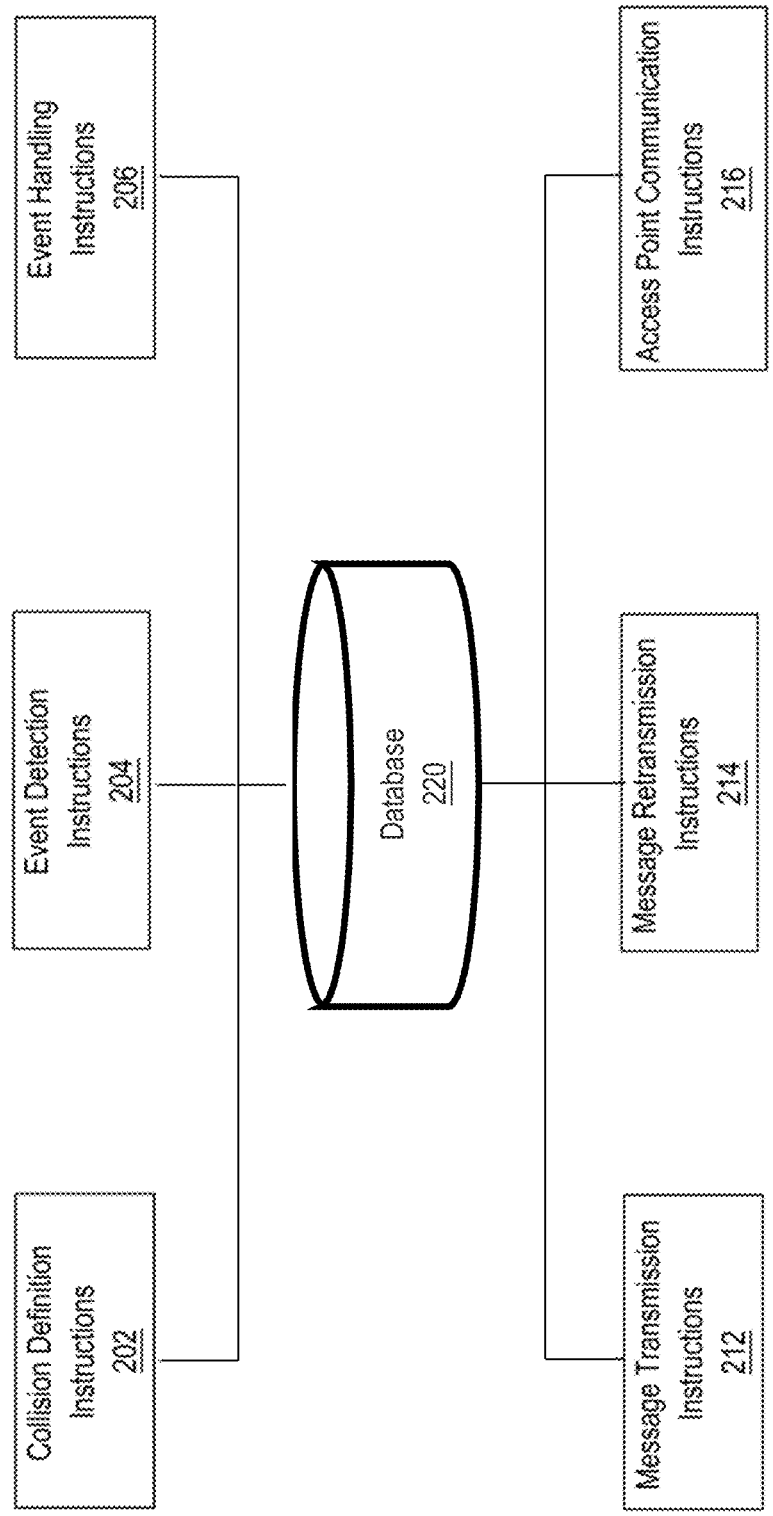
FIG. 2 illustrates example components of a node in a wireless computer network in accordance with the disclosed embodiments.

FIG. 2 illustrates example components of a node in a wireless computer network in accordance with the disclosed embodiments. This figure is for illustration purposes only and the node can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the node can comprise a collision definition component 202, an event detection component 204, an event handling component 206 for functions performed as an access point that receives messages from other nodes. The node can also comprise an access point communication component 212, a message transmission component 214, and a message retransmission component 216 for functions related to transmitting or retransmitting messages to an access point. In addition, the node can comprise a database module 220.

In some embodiments, the collision definition component 202 is programmed or configured to create, update, and otherwise manage collision patterns, which are used to trigger collision and restoration events leading to the determination of a backoff window or backoff slots. The event detection component 204 is programmed or configured to determine the satisfaction or dissatisfaction of specific collision patterns and the triggering of collision or restoration events. The event handling component 206 is programmed or configured to determine the backoff window or backoff slots in response to the triggering of a collision or restoration event. The determination may include updating the length of the backoff window, the number of backoff slots in which to divide the backoff window, or the assignment of the backoff slots to colliding nodes for message retransmission.

In some embodiments, the access point communication component 212 is programmed or configured to receive messages from an access point, including general broadcast messages related to backoff windows or acknowledgement messages in response to transmitted messages. The message transmission component 214 is programmed or configured to transmit messages to an access point and determine whether message transmission is successful. The message retransmission component 216 is programmed or con figured to retransmit messages to an access point when initial message transmission was unsuccessful in accordance with collision avoidance policies, including rules related to a backoff window or backoff slots as communicated by the access point.

In some embodiments, the database 220 is programmed or configured to manage relevant data structures and store relevant data for functions performed as an access point that receives messages from other nodes, such as definitions of data transmission errors, collision patterns, logs of collision and restoration events, quality of service ("QoS") requirements or other properties of other nodes, or current properties of the backoff window and backoff slots. The database 220 is programmed or configured to further manage relevant data structures and store relevant data for functions related to transmitting or retransmitting messages to an access point, such as logs of transmitting and retransmitting messages or current properties of the backoff window and backoff slots.

4. Defining Collision Events and Restoration Events

In some embodiments, a node acting as an access point is programmed or configured with data structures and/or database records that are arranged to create a set of instructions for defining collision events and restoration events. In general, collision in data transmission can manifest itself in data corruption, data loss, or unusually high data transmission rates. A collision may be a one-time event or may constitute a pattern during a busy period. The access point is programmed to define collision patterns generally based on the nature and frequency of occurrence of transmission abnormalities. The occurrence of a collision pattern triggers a collision event, and the subsequent disappearance of a collision pattern triggers a restoration event. Transmission abnormalities include an FCS error where cyclic redundancy checking ("CRC") of a data packet in a message fails, an alignment error where byes of a data packet are not aligned, a packet loss where non-consecutive packets are received, or an unusually high signal amplitude on the bus through which messages are delivered to the access point, as evaluated against a certain aggregate signal amplitude threshold. A collision pattern can indicate the frequency of occurrence for a certain combination of transmission abnormalities during a specified period.

In some embodiments, the access point is programmed or configured to update the collision patterns periodically, upon request by a connected node or neighbor in the wireless computer network, in response to changes in the nature or frequency of occurrence of transmission abnormalities, or based on a predetermined schedule.

5. Triggering Collision Events or Restoration Events

In some embodiments, the access point is programmed or configured with data structures and/or database records that are arranged to create a set of instructions for triggering a collision event or a restoration event. Specifically, each time a message is received, the access point is configured to log the incoming transmission in terms of identity of the sender, time of receipt, any QoS requirements included in the message, any transmission abnormalities, and so on. The QoS requirement can include the length of a transmit ("TX) buffer, which indicates the amount of traffic in excess of the physical capacity of the node and thus a service level. The access point is also configured to evaluate the state of incoming transmission overall periodically or according to a predetermined schedule. Each time a message is received or an evaluation of the incoming transmission state is performed, or according to another predetermined schedule, the access point is further programmed to determine whether any of the collision patterns occurs or disappears. Upon determining the occurrence any collision pattern, the access point is programmed to trigger a collision event. Upon determining the disappearance of at least one collision pattern, the access point is programmed to trigger a restoration event.

In some embodiments, after detecting the occurrence of a collision pattern and triggering a corresponding collision event, the access point is programmed to determine whether the collision pattern has disappeared only after the collision event is handled or some condition associated with collision handling is satisfied, such as that the backoff window starting with the time of collision is over. In that case, when the collision event is still being handled, the determination that the collision pattern has disappeared does not lead to a restoration event.

In some embodiments, for the occurrence of a collision pattern, the access point is programmed to identify a plurality of sender nodes as satisfying the collision pattern ("colliding sender nodes"). When the collision pattern corresponding to a specific period, the access point can be programmed to identify at least some of the nodes from each of which a message was received during the specific period as colliding sender nodes. As noted above, in the absence of transmission errors related to the transmission of a message, the access point can generally be configured to send an acknowledgement message to the sender of the message indicating successful transmission. When the sender has been identified as a colliding sender node simply because the message was sent during the specific period, however, the access point can be configured to skip sending such an acknowledgement message. On the other hand, even if the message was sent during the specified period, the sender might not be identified as a colliding sender node in the absence of transmission errors, and an acknowledgement message indicating successful transmission will be set as usual, with no retransmission necessary.

6. Handling Collision Events

6.1 Communicating Backoff Window Information

FIG. 3 illustrates setting properties of a backoff window for avoiding collision in data transmission. FIG. 3A illustrates setting the length of the backoff window to a first length, such as a MAX value, in response to a collision event.

In some embodiments, the access point is programmed or configured with data structures and/or database records that are arranged to create a set of instructions for handling a collision event. In response to a collision event corresponding to the occurrence of a collision pattern, the access point is programmed to set the length of a backoff window for avoiding collision to a first length. As noted above, the purpose of the backoff window is to increase the chance that messages transmitted by the colliding sender nodes would be retransmitted at different times. In general, the longer the backoff window, the lower the chance of collision in message retransmission.

In some embodiments, the access point is programmed to determine the first length based on the number of connected nodes or neighbors (or nodes that can be sensed by or is visible to the access point), or at least the number of nodes from which messages have ever been received by the access point during a certain period, the number of sender nodes involved in the collision pattern, the number of those sender nodes for which the initial transmission resulted in transmission errors, the aggregate (average, median, maximum, minimum, etc.) number of sender nodes involved in the same collision pattern or across all collision patterns, the aggregate amount of time required for transmitting or retransmitting a message to the access point, or the frequency of collision events. In general, the first length increases when one of these numbers, amounts of time, or frequencies increases. The access point can also be configured to make the first length large enough that the probability of collision does not exceed a specific threshold. For example, when an aggregate number of sender nodes involved in the collision pattern is X and the aggregate amount of retransmitting a message to the access point is Y, the first length can be set to at least the product of X and Y.

In some embodiments, the access point is programmed to communicate the first length to a group of connected nodes, including the colliding sender nodes. Specifically, the access point can be programmed to broadcast the collision event, including the first length of the backoff window, to all its neighbors. For example, the access point can be configured to include information regarding the collision event and specifically the backoff window in a beacon frame under IEEE 802.11 b, instructing each recipient to randomly select a point within the backoff window having the first length for message retransmission in the absence of an acknowledgement message indicating successful transmission. Additional information regarding the collision event can be included in the communication, such as the number of colliding sender nodes or the preferred start time of the backoff window. Alternatively, the access point can be programmed to send information regarding the collision event only to the colliding sender nodes. The information can be sent in the form of an acknowledgement message indicating that the transmission was unsuccessful and a collision event has occurred.

In some embodiments, when a node has transmitted a message to the access point and received no acknowledgment message indicating successful transmission, in response to receiving the broadcast or acknowledgment message, the node is programmed to retransmit the message previously transmitted to the access point in accordance with the backoff window having the first length. Specifically, the node is programmed to randomly select a point within the backoff window, such as the beginning, the middle, or the end of the backoff window. The point can also be selected based on specific rules, such as always 3 quarters into the backoff window. In addition, the point can be selected based on specific factors, such as the QoS requirement of the node, additional information included in the broadcast or acknowledgment message received from the access point, or a history of such broadcast or acknowledgment messages. As one example, the node can be configured to select an earlier point within the backoff window in response to a more urgent need to satisfy its QoS requirement. As another example, given the list of colliding sender nodes and their QoS requirements, the node can be configured to select a point based on the ranking of its QoS requirement relative to the QoS requirements of the other colliding sender nodes. The node is programmed to also set the start time of the backoff window to the time when the message was initially transmitted to the access point, the time of determining that the initial transmission was unsuccessful, such as the end of a certain period without receiving any acknowledgment message indicating successful transmission, the time when the broadcast or acknowledgment message was sent by the access point or received by the node, or another time instructed in the broadcast or acknowledgment message. The node is further programmed to then retransmit the message to the access point at the selected point during the backoff window, with the start time and the first length.

In some embodiments, when the node has not transmitted a message to the access point and received no acknowledgment message indicating successful transmission, in response to receiving the broadcast message, the node is programmed to retransmit a message transmitted to the access point in the future in accordance with the backoff window having the first length. Specifically, upon receiving the broadcast message, subsequently transmitting a message to the access point, and receiving no acknowledgement message indicating successful transmission, the node is programmed to select a point within the backoff window, as discussed above. The node initially is also programmed to set the start time of the backoff window to the time when the message was transmitted to the access point, the time of determining that the initial transmission was unsuccessful, such as the end of a certain period without receiving any acknowledgment message indicating successful transmission, or another time instructed in the broadcast message. The node is further programmed to then retransmit the message to the access point at the selected point during the backoff window, with the start time and the first length.

In some embodiments, when the node has not transmitted a message to the access point and received no acknowledgment message indicating successful transmission, in response to receiving the broadcast message, the node is programmed to transmit the next message to the access point in accordance with the backoff window having the first length as if performing a retransmission. While the initial message transmission does not follow a collision event and thus any delay in transmission is not technically a backoff, the similar delay will also help alleviate congestion at the access point, especially when the message was to be transmitted soon after receiving the broadcast message. Specifically, upon receiving the broadcast message, the node is programmed to select a point within the backoff window, as discussed above. The node is also programmed to set the start time of the backoff window to the time when the broadcast message was sent by the access point or received by the node, or another time instructed in the broadcast message. The node is further programmed to then transmit the message to the access point at the selected point during the backoff window, with the start time and the first length.

In some embodiments, in response to receiving the broadcast or acknowledgment message, a node is programmed to repeatedly retransmit a message in accordance with the backoff window having the first length, until an acknowledgment message is received indicating that the retransmission was successful or until another broadcast or acknowledgement message is received indicating a different length for the backoff window or a new assignment of certain slots within the backoff window, as further discussed below. Specifically, in subsequent attempts to retransmit the message, the node is programmed to select a point within the backoff window, as discussed above, which can also just be the same point selected in earlier attempts. The node is also programmed to reset the start time of the backoff window to when the message was last retransmitted to the access point, the time of determining that the last retransmission was unsuccessful, the time when the new broadcast or acknowledgment message was sent by the access point or received by the node, or another time instructed in the broadcast message. The node is further programmed to then retransmit the message to the access point at the selected point during the backoff window.

6.2 Communicating Backoff Slots Information

FIG. 3B illustrates setting the length of the backoff window to a first length, such as a MAX value, and further dividing the backoff window into a number of non-overlapping slots and assigning the number of slides to certain other nodes in response to a collision event.

In some embodiments, in response to a collision event corresponding to the occurrence of a collision pattern, in addition to the setting the length of the backoff window for avoiding collision to a first length, as noted above, the access point is programed to further divide the backoff window into a number of slots 304 and assign the number of slots to a plurality of nodes, including the colliding sender nodes. The main purpose of these slots is to ensure that the messages previously sent by the colliding sender nodes would be retransmitted at different times. Therefore, in the case where different slots are assigned to different collider sender nodes and the backoff window is set to start at a common time for all the colliding sender nodes, the messages retransmitted by the colliding sender nodes during the assigned slots would not collide with one another.

In some embodiments, the access point is programmed to determine the number of slots based on the number of connected nodes or at least the number of nodes from which messages have ever been received by the access point during a certain period, the number of sender nodes involved in the collision pattern, the number of those sender nodes for which the initial transmission resulted in transmission errors, or the aggregate (average, median, maximum, minimum, etc.) number of sender nodes involved in the same collision pattern or across all collision patterns. The access point is further programmed to assign the number of slots to the plurality of nodes based on the QoS requirements of the nodes, the aggregate amount of time required for each of the plurality of nodes to transmit or retransmit a message to the access point, the history of collision events, or other specific priorities assigned to the plurality of nodes. Different slots can have the same length or different lengths. Different slots that are adjacent or non-adjacent can be assigned to the same node. For example, the access point can be configured to assign earlier or more slots to a node with a higher QoS requirement, assign non-adjacent spots to nodes that have often collided with each other, or assign adjacent or bigger spots to nodes that have required more time to transmit or retransmit messages to the access point.

In some embodiments, the access point is programmed to communicate the assignment of the number of slots within the backoff window to the plurality of nodes, including the colliding sender nodes. Specifically, the access point can be programmed to broadcast the collision event, including the first length of the backoff window and the assignment of the number of slots within the backoff window, to all its neighbors. For example, the access point can be configured to include information regarding the collision event and specifically the backoff window in a beacon frame under IEEE 802.11 b, instructing each recipient to select one of the assigned slots within the backoff window having the first length for message retransmission in the absence of an acknowledgement message indicating successful transmission. Additional information regarding the collision event can be included, such as the number of colliding sender nodes or the preferred start time of the backoff window. Alternatively, the access point can be programmed to send information regarding the collision event only to the colliding sender nodes. The information can be sent in the form of an acknowledgement message indicating that the transmission was unsuccessful and a collision event has occurred. The access point can be configured to include only assignment information relevant to the node in the message sent to the node, such as the indices of the slots assigned to node, or simply the beginning and ending times of the assigned slots.

In some embodiments, when the node has transmitted a message to the access point and received no acknowledgment message indicating successful transmission, in response to receiving the broadcast or acknowledgment message, the node is programmed to retransmit the message previously transmitted to the access point in accordance with the assignment of the number of slots within the backoff window having the first length. Specifically, the node is programmed to select one of the slots assigned to the node. The selection can be made randomly or based on specific rules or specific factors, similar to the selection of a point within the backoff window discussed above. The node is programmed to also set the start time of the backoff window to the time when the message was initially transmitted to the access point, the time of determining that the initial transmission was unsuccessful, such as the end of a certain period without receiving any acknowledgment message indicating successful transmission, the time when the broadcast or acknowledge message was sent by the access point or received by the node, or another time instructed in the broadcast or acknowledgment message. The node is further programmed to then retransmit the message to the access point during the selected slot within the backoff window, typically at the beginning of the selected slot.

In some embodiments, when the node has not transmitted a message to the access point and received no acknowledgment message indicating successful transmission, in response to receiving the broadcast message, the node is programmed to retransmit a message initially transmitted to the access point in the future in accordance with the assignment of the number of slots within the backoff window having the first length. Specifically, upon receiving the broadcast message, subsequently transmitting a message to the access point, and receiving no acknowledgement message indicating successful transmission, the node is programmed to select one of the slots assigned to the node, as discussed above. The node is also programmed to set the start time of the backoff window to the time when the message was initially transmitted to the access point, the time of determining that the initial transmission was unsuccessful, such as the end of a certain period without receiving any acknowledgment message indicating successful transmission, or another time instructed in the broadcast message. The node is further programmed to then retransmit the message to the access point during the selected slot within the backoff window, typically at the beginning of the selected slot.

In some embodiments, when the node has not transmitted a message to the access point and received no acknowledgment message indicating successful transmission, in response to receiving the broadcast message, the node is programmed to transmit the next message to the access point in accordance with the assignment of the number of slots within the backoff window having the first length as if performing a retransmission. While the initial message transmission does not follow a collision event and thus any delay in transmission is not technically a backoff, the similar delay will also help alleviate congestion at the access point, especially when the message was to be transmitted soon after receiving the broadcast message. Specifically, upon receiving the broadcast message, the node is programmed to select one of the slots assigned to the node, as discussed above. The node is also programmed to set the start time of the backoff window to the time when the broadcast message was sent by the access point or received by the node, or another time instructed in the broadcast message. The node is further programmed to then transmit the message to the access point during the selected slot within the backoff window, typically at the beginning of the selected slot.

Among the nodes that set the backoff window to start at a common time and retransmit messages during the assigned slots, the retransmitted messages will not collide with one another, but they are still likely to collide with messages transmitted or retransmitted by other nodes. In some embodiments, in response to receiving the broadcast or acknowledgment message, a node is programmed to repeatedly retransmit a message in accordance with the assignment of the number of slots within the backoff window having the first length, until an acknowledgment message is received indicating that the retransmission was successful or until another broadcast or acknowledgement message is received indicating a different length for the backoff window or a different assignment of certain slots within the backoff window. Specifically, in subsequent attempts to retransmit the message, the node is programmed to select one of the assigned slots within the backoff window, as discussed above, which can also just be the same assigned slot selected in earlier attempts. Before time within the backoff window runs out, the node can also be configured to select another assigned slot. After the time within the backoff window runs out, the node can be configured to select any point within the backoff window or even ignore the backoff window after the first attempt. Furthermore, the node is programmed to reset the start time of the backoff window to when the message was last retransmitted to the access point, the time of determining that the last retransmission was unsuccessful, the time when the new broadcast or acknowledgment message was sent by the access point or received by the node, or another time instructed in the broadcast message. The node is further programmed to then retransmit the message to the access point during the selected slot within the backoff window or at the selected point during or outside the backoff window.

7. Handling Restoration Events

FIG. 3C illustrates setting the length of the backoff window to a second length, such as a MIN value, in response to a restoration event.

In some embodiments, the access point is programmed or configured with data structures and/or database records that are arranged to create a set of instructions for handling a restoration event. In response to a restoration event corresponding to the disappearance of a collision pattern, the access point is programmed to set the length of a backoff window for avoiding collision to a second length. The second length is generally smaller than the first length because fewer nodes are likely to collide with the disappearance of at least the collision pattern.

In some embodiments, the access point is programmed to determine the second length based on the number of connected nodes or at least the number of nodes from which messages have ever been received by the access point during a certain period, the number of sender nodes involved in the collision pattern, the number of those sender nodes for which the initial transmission resulted in transmission errors, the aggregate (average, median, maximum, minimum, etc.) number of sender nodes involved in the same collision pattern or across all collision patterns, the aggregate amount of time required for transmitting or retransmitting a message to the access point, or the frequency of collision events. For example, when the frequency of collision events drops by 20%, the second length could be set to be the first length decreased by 20%. The second length could also be set to a default number that is invariant over time.

In some embodiments, the access point is programmed to communicate the second length to a group of connected nodes, including the sender nodes involved in the collision pattern. Specifically, the access point can be programmed to broadcast the restoration event, including the second length of the backoff window, to all its neighbors. For example, the access point can be configured to include information regarding the restoration event and specifically the backoff window in a beacon frame under IEEE 802.11 b, instructing each recipient to randomly select a point within the backoff window having the second length for message retransmission in the absence of an acknowledgement message indicating successful transmission. Additional information regarding the restoration event can be included, such as the number of the colliding sender nodes or the preferred start time of the backoff window. Alternatively, the access point can be programmed to send information regarding the restoration event only to the colliding sender nodes, those nodes to which information regarding the prior collision event was previously sent, or those nodes which each have transmitted a message to the access point but have not received an acknowledgement message indicating successful transmission. In the last case, the information can be sent in the form of an acknowledgement message indicating that the transmission was successful or unsuccessful together with the second length for the backoff window.

In some embodiments, when the node has transmitted a message to the access point and received no acknowledgment message indicating successful transmission, in response to receiving the broadcast or acknowledgment message, the node is programmed to retransmit the message previously transmitted to the access point in accordance with the backoff window having the second length. Specifically, the node is programmed to select a point within the backoff window, set the start time of the backoff window, and retransmit the message to the access point at the selected point during the backoff window, with the start time and the second length, as similarly discussed above in connection with the backoff window having the first length.

In some embodiments, when the node has not transmitted a message to the access point and received no acknowledgment message indicating successful transmission, in response to receiving the broadcast message, the node is programmed to retransmit a message transmitted to the access point in the future in accordance with the backoff window having the second length. Specifically, upon receiving the broadcast message, subsequently transmitting a message to the access point, and receiving no acknowledgement message indicating successful transmission, the node is programmed to select a point within the backoff window, set the start time of the backoff window, and retransmit the message to the access point at the selected point during the backoff window, with the start time and the second length, as similarly discussed above.

In some embodiments, when the node has not transmitted a message to the access point and received no acknowledgment message indicating successful transmission, in response to receiving the broadcast message, the node is programmed to transmit the next message to the access point in accordance with the backoff window having the second length as if performing a retransmission. Specifically, upon receiving the broadcast message, the node is programmed to select a point within the backoff window, set the start time of the backoff window, and transmit the message to the access point at the selected point during the backoff window, with the start time and the second length, as similarly discussed above.

In some embodiments, in response to receiving the broadcast or acknowledgment message, a node is programmed to repeatedly retransmit a message in accordance with the backoff window having the second length, until an acknowledgment message is received indicating that the retransmission was successful or until another broadcast or acknowledgement message is received indicating a different length for the backoff window or a new assignment of certain slots within the backoff window. Specifically, in subsequent attempts to retransmit the message, the node is programmed to select a point within the backoff window, reset the start time of the backoff window, and then retransmit the message to the access point at the selected point during the backoff window, with the start time and the second length, as similarly discussed above.

8. Example Processes

Figure 5:
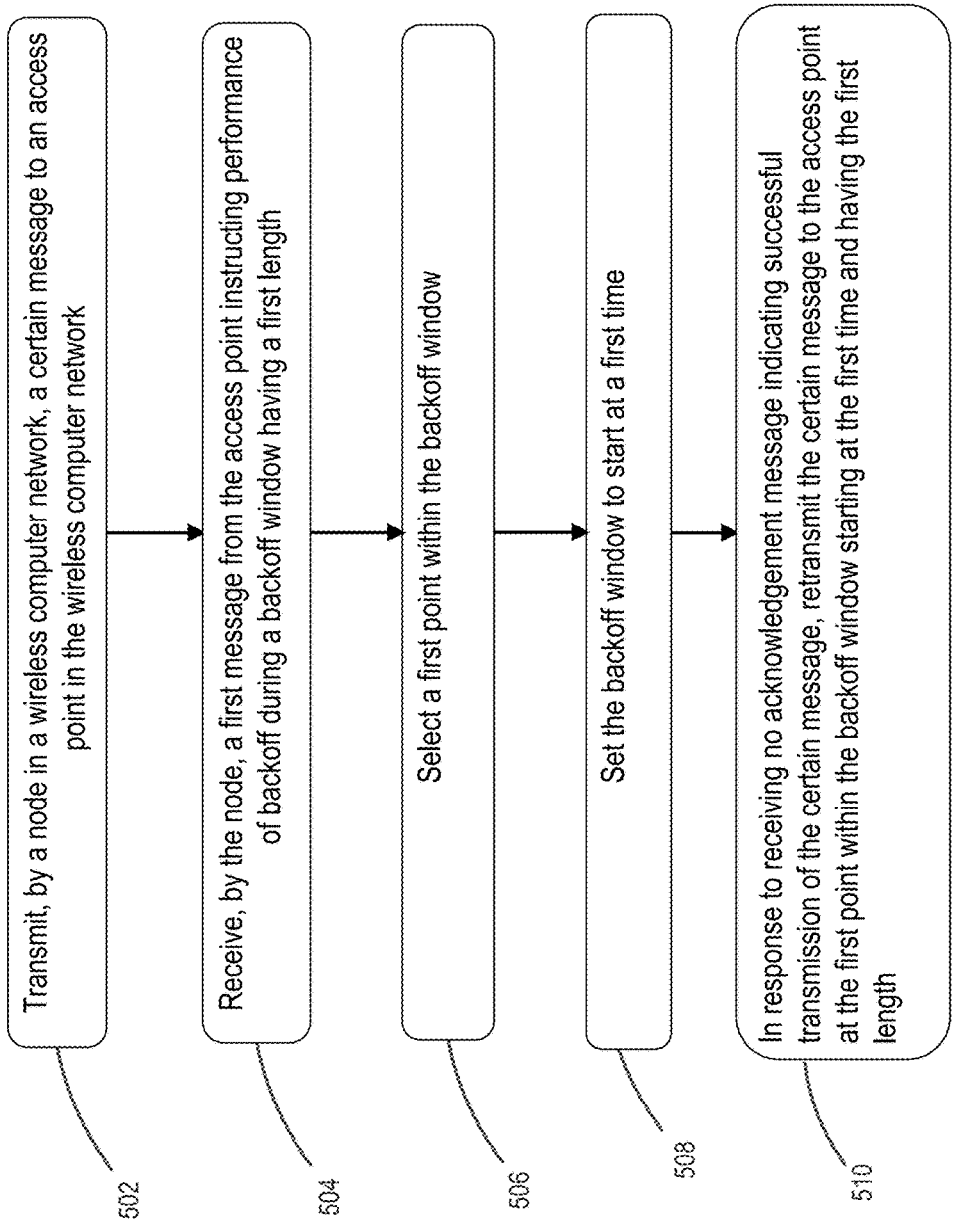
FIG. 5 illustrates an example process of performing backoff to avoid collision in message transmission in a wireless computer network.

FIG. 4 illustrates an example process of determining backoff windows for avoiding collision in data transmission in a wireless computer network. FIG. 5 illustrates an example process of performing backoff to avoid collision in data transmission in a wireless computer network. FIG. 4 and FIG. 5 are intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Referring first to FIG. 4, in some embodiments, in step 402, a node in the wireless computer network as an access point is programmed or configured to define a plurality of collision patterns related to message transmission via one or more communication channels in the wireless computer network. The collision patterns can be defined in terms of the nature and frequency of occurrence of transmission abnormalities, such as data corruption or loss. In step 404, the access point is programmed or configured to detect occurrence of one of the plurality of collision patterns involving a group of sender nodes in the wireless computer network that have each transmitted a message to the access point and received no acknowledgement message from the access point indicating successful transmission. Specifically, the access point can be configured to determine whether any of the collision patterns has occurred or disappeared every time a message is received by the access point or according to a specific schedule. The occurrence of a collision pattern triggers a collision event. In step 406, the access point is programmed or configured to set to a first length a length of a backoff window for avoiding collision in message retransmission based on a size of the plurality of sender nodes. The determination can be based on other factors, such as a history of collision events, an aggregate number of nodes involved in any collision pattern, or an aggregate time for transmitting or retransmitting a message to the access point. In step 408, the access point is programmed or configured to send a first message to a first plurality of nodes in the wireless computer network, the first message instructing performance of backoff during the backoff window having the first length. The first plurality of nodes generally includes the group of sender nodes. The first message can be sent through a broadcast to all the nodes connected to the access point or as an acknowledgement message to at least some of the group of sender nodes.

In some embodiments, in addition to setting the length of the backoff window, the access point is programmed or configured to divide the backoff window into a number of non-overlapping slots and assigning the number of slots to the first plurality of nodes. The division and assignment can also be based on a variety of factors, such as the QoS requirements of the first plurality of nodes. The first message can then instruct performance of backoff during one of the assigned slots within the backoff window having the first length.

In some embodiments, the disappearance of a collision pattern triggers a restoration event. The access point is further programmed or configured to then set the length of the backoff window to a second length smaller than the first length. Furthermore, the access point is programmed or configured to send a second message to a second plurality of nodes in the wireless computer network, the second message instructing performance of backoff during the backoff window having the second length. The second plurality of nodes can include some of the nodes in the first plurality of nodes or some nodes which have each transmitted a message to the access point and received no acknowledgment message from the access point indicating successful transmission.

Referring now to FIG. 5, in step 502, a node in a wireless computer network is programmed or configured to transmit a certain message to an access point in the wireless computer network. In step 504, the node is programmed or configured to receive a first message in response to a collision event from the access point instructing performance of backoff during a backoff window having a first length. The first message can be received before or after the transmission of the certain message. In step 506, the node is programmed or configured to select a first point within the backoff window. The selection can be based on various factors, such as the QoS requirement of the node. In step 508, the node is programmed or configured to set the backoff window to start at a first time. This step can be performed before step 506. The first time can be when the certain message was transmitted by the node, at the end of a period when no acknowledgement message has been received indicating successful transmission of the certain message, or when the first message was sent by the access point or received by the node. In step 510, in response to receiving no acknowledgement message indicating successful transmission of the certain message, the node is programmed or configured to retransmit the certain message to the access point at the first point within the backoff window starting at the first time and having the first length.

In some embodiments, the first message further instructs performance of backoff during assigned slots within the backoff window having the first length. For example, given a backoff window of 10 minutes, the first message may indicate an assigned slot during the first minute and another assigned slot during the sixth minute. The node is then programmed or configured to select one of the assigned slots within the backoff window and retransmit the certain message during the selected slot. The node can also be configured to select a point within the selected slot and retransmit the certain message at the selected point within the selected slot.

In some embodiments, in response to a restoration event that occurred after the collision event, the node is programmed or configured to receive a second message from the access point instructing performance of backoff during a backoff window having a second length smaller than the first length. The node is programmed or configured to similarly select a second point within the backoff window, set the backoff window to start at a second time, and retransmit the certain message or another message the node has transmitted to the access point but received no acknowledgement indicating successful transmission at the second point within the backoff window starting at the second time and having the second length.

In some embodiments, the node is programmed or configured to repeatedly retransmit a message in accordance with the backoff window having a specific length and any assignment of certain slots within the backoff window, as instructed by the access point, until the retransmission is successful or a new instruction is received from the access point.

9. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
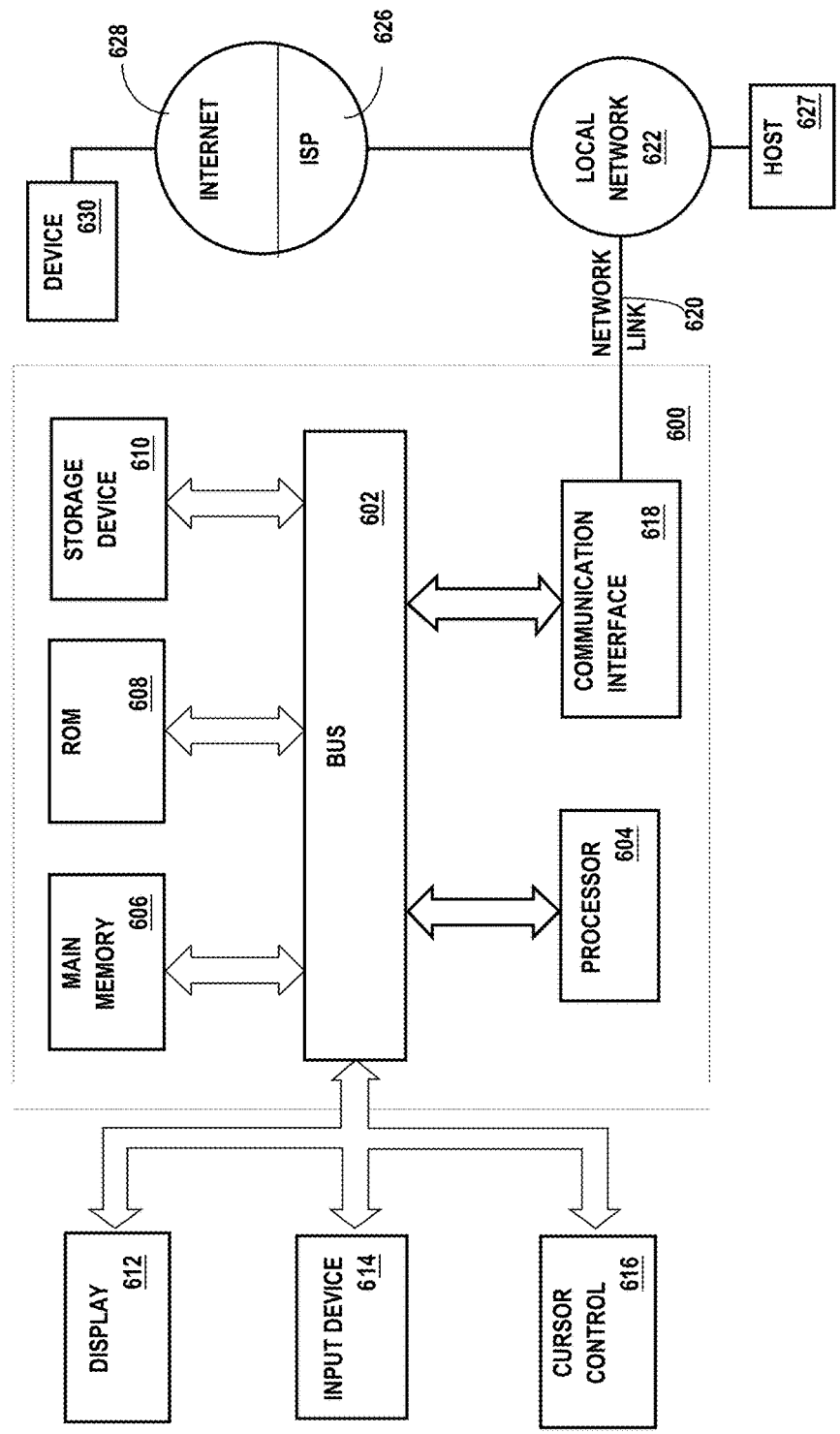
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 627 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a device 630 might transmit a requested code for an application program through Internet 628, ISP 626, local network 622 and communication interface 618.

The received code may be executed by processor 604 as it is received, and/or stored in storage device 610, or other non-volatile storage for later execution.

10. Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method of determining backoff windows in a wireless computer network, comprising:
    defining, by an access point in the wireless computer network, a plurality of collision patterns related to message transmission via one or more communication channels in the wireless computer network;
    detecting, by the access point, occurrence of one of the plurality of collision patterns involving a group of sender nodes in the wireless computer network that have each transmitted a message to the access point and received no acknowledgement message from the access point indicating successful transmission;
    setting to a first length a length of a backoff window for avoiding collision in data transmission based on a size of the group of sender nodes;
    sending a first message to a first plurality of nodes in the wireless computer network, the first message instructing performance of backoff during the backoff window having the first length,
    wherein the method is performed using one or more processors in the access point in the wireless computer network.

2. The computer-implemented method of claim 1, the plurality of collision patterns being based on transmission abnormalities, including a file check sequence (FCS) error, an alignment error, a packet loss, or a signal amplitude on a bus through which messages are delivered to the access point that is higher than a signal amplitude threshold.

3. The computer-implemented method of claim 1, the first length being set further based on a number of nodes from which messages have ever been received by the access point during a certain period, a number of the group of sender nodes for which initial transmission resulted in transmission errors, an aggregate number of sender nodes involved in a specific collision pattern or across all collision patterns, an aggregate amount of time required for transmitting or retransmitting a message to the access point, or a frequency of collision events.

4. The computer-implemented method of claim 1, further comprising:
    detecting disappearance of the one collision pattern;
    setting the length of the backoff window to a second length smaller than the first length;
    sending a message to a second plurality of nodes in the wireless computer network, the message instructing performance of backoff during the backoff window having the second length.

5. The computer-implemented method of claim 4, the detecting being performed after the backoff window having the first length is over.

6. The computer-implemented method of claim 1, the first plurality of nodes being nodes in the wireless network that are connected to the access point.

7. The computer-implemented method of claim 1, the first plurality of nodes being the group of sender nodes.

8. The computer-implemented method of claim 7, further comprising:
    dividing the backoff window into a number of slots;
    assigning the number of slots to the group of sender nodes;
    the first message instructing performance of backoff during an assigned slot within the backoff window.

9. The computer-implemented method of claim 8, multiple of the number of slots being assigned to one of the group of sender nodes.

10. The computer-implemented method of claim 8, the assigning being performed based on quality of service requirements of the group of sender nodes, an aggregate amount of time required for each of the first plurality of nodes to transmit or retransmit a message to the access point, the history of collision events, or other specific priorities assigned to the first plurality of nodes.

11. The computer-implemented method of claim 8, further comprising:
    the first message further instructing a start time of the backoff window,
    in response to sending the first message, receiving a message from one of the group of sender nodes during a slot assigned to the one sender node within the backoff window started at the start time.

12. A computer-implemented method of performing backoff to avoid collision in data transmission in a wireless computer network, comprising:
    transmitting, by a node in the wireless computer network, a certain message to an access point in the wireless computer network;
    receiving, by the node, a first message from the access point instructing performance of backoff during a backoff window having a first length;
    selecting a first point within the backoff window;
    setting the backoff window to start at a first time;
    in response to receiving no acknowledgement message indicating successful transmission of the certain message, retransmitting the certain message to the access point at the first point within the backoff window starting at the first time and having the first length,
    wherein the method is performed using one or more processors in the node in the wireless computer network.

13. The computer-implemented method of claim 12, the first message being broadcast to nodes connected to the access point.

14. The computer-implemented method of claim 12, the first point being selected randomly from the backoff window.

15. The computer-implemented method of claim 12, the first time being when the certain message was transmitted by the node, a certain period after the certain message was transmitted by the node, when the first message was transmitted by the access point, or when the first message was received by the node.

16. The computer-implemented method of claim 12, the certain message being transmitted after receiving the first message.

17. The computer-implemented method of claim 12, the certain message being transmitted before the first message, and the first message being responsive to the certain message.

18. The computer-implemented method of claim 12,
    the first message including an assignment of one or more slots within the backoff window to the node and instructing performance of backoff during the one or more assigned slots,
    the first point falling in the one assigned slot.

19. The computer-implemented method of claim 18, further comprising selecting one of the assigned slots based on a quality of service requirement of the node.

20. The computer-implemented method of claim 12, further comprising:

receiving a second message from the access point instructing performance of backoff during the backoff window having a second length smaller than the first length;

transmitting a specific message to the access point;

after receiving the second message, selecting a second point within the backoff window;

setting the backoff window to start at the second time;

in response to receiving no acknowledgement message indicating successful transmission of the specific message, retransmitting the specific message to the access point at the second point within the backoff window starting at the second time and having the second length.

\* \* \* \* \*